United States Patent
Winkler et al.

(10) Patent No.: US 8,056,322 B2
(45) Date of Patent: Nov. 15, 2011

(54) SYSTEM AND METHOD FOR SUPPLYING OXYGENATE REDUCTANTS TO AN EMISSION TREATMENT SYSTEM

(75) Inventors: Benjamin Hale Winkler, Albany, NY (US); Dan Hancu, Clifton Park, NY (US); Frederic Vitse, Knoxville, TN (US); Norberto Silvi, Clifton Park, NY (US); Hua Wang, Clifton Park, NY (US); Ke Liu, Rancho Santa Margarita, CA (US)

(73) Assignee: General Electric Company, Niskayuna, NY (US)

( * ) Notice: Subject to any disclaimer, the term of this patent is extended or adjusted under 35 U.S.C. 154(b) by 981 days.

(21) Appl. No.: 11/971,266

(22) Filed: Jan. 9, 2008

(65) Prior Publication Data
US 2008/0098728 A1 May 1, 2008

Related U.S. Application Data

(63) Continuation-in-part of application No. 11/301,231, filed on Dec. 12, 2005, now Pat. No. 7,487,631.

(51) Int. Cl.
*F01N 3/00* (2006.01)

(52) U.S. Cl. ............... 60/286; 60/274; 60/295; 60/297; 60/301; 60/303; 123/1 A; 123/3; 95/45; 95/47; 95/50; 95/54; 95/55

(58) Field of Classification Search .............. 60/274, 60/286, 295, 297, 301, 303; 123/1 A, 3; 95/45, 47, 50, 54, 55
See application file for complete search history.

(56) References Cited

U.S. PATENT DOCUMENTS

| | | | |
|---|---|---|---|
| 4,266,946 A | 5/1981 | Niebylski | |
| 4,479,473 A | 10/1984 | Wade | |
| 4,744,217 A | 5/1988 | Goerlich et al. | |
| 5,586,433 A | 12/1996 | Boegner et al. | |
| 5,985,222 A | 11/1999 | Sudduth et al. | |
| 6,526,950 B2 * | 3/2003 | Ito et al. ............ | 123/518 |

(Continued)

FOREIGN PATENT DOCUMENTS
DE 102005055151 A1 6/2006
(Continued)

OTHER PUBLICATIONS

PCT International Search Report dated Mar. 27, 2009.

*Primary Examiner* — Binh Q Tran
(74) *Attorney, Agent, or Firm* — Joseph J. Christian (57) ABSTRACT

A system is provided for supplying reductants to an emission treatment unit. The system comprises a fuel tank adapted to directly or indirectly supply a first premixed fuel stream and a second premixed fuel stream, wherein each fuel stream comprises a primary fuel component and an oxygenate reductant component. An engine is in fluid communication with the fuel tank, wherein the engine is configured to receive the first premixed fuel stream and create an exhaust stream. The system further includes an emission treatment unit to treat the exhaust stream. A separation unit is configured to receive the second premixed fuel stream, separate the second premixed fuel stream into a first fraction stream and a second fraction stream, and supply the first fraction stream to the emission treatment unit, wherein the first fraction stream comprises a higher concentration of the oxygenate reductant component than the second fraction stream.

39 Claims, 8 Drawing Sheets

U.S. PATENT DOCUMENTS

| | | | |
|---|---|---|---|
| 6,711,893 B2 * | 3/2004 | Ueda et al. | 60/285 |
| 6,719,824 B1 * | 4/2004 | Bowser | 95/50 |
| 6,887,300 B2 | 5/2005 | Nemser | |
| 6,919,047 B1 | 7/2005 | He et al. | |
| 6,968,678 B2 * | 11/2005 | Le Leux et al. | 60/280 |
| 7,017,336 B2 | 3/2006 | Stiermann | |
| 7,040,084 B2 * | 5/2006 | Ament | 60/274 |
| 7,155,331 B1 | 12/2006 | Zhang et al. | |
| 7,204,081 B2 | 4/2007 | Yasui et al. | |
| 7,487,631 B2 * | 2/2009 | Cueman et al. | 60/286 |
| 2002/0139111 A1 | 10/2002 | Ueda et al. | |
| 2004/0154215 A1 | 8/2004 | Kass et al. | |
| 2004/0159096 A1 | 8/2004 | Yasui et al. | |
| 2004/0261403 A1 | 12/2004 | Asmus et al. | |
| 2005/0137083 A1 | 6/2005 | Rocha et al. | |
| 2005/0138916 A1 | 6/2005 | Bonadies et al. | |
| 2005/0178110 A1 | 8/2005 | Mital et al. | |
| 2005/0267224 A1 | 12/2005 | Herling et al. | |
| 2006/0133977 A1 | 6/2006 | Male et al. | |
| 2007/0000239 A1 | 1/2007 | Liu et al. | |
| 2007/0000243 A1 | 1/2007 | Liu et al. | |
| 2007/0068144 A1 * | 3/2007 | Iwase et al. | 60/286 |
| 2007/0130918 A1 | 6/2007 | Cueman et al. | |
| 2007/0271908 A1 | 11/2007 | Hemingway et al. | |

FOREIGN PATENT DOCUMENTS

| | | |
|---|---|---|
| EP | 1211394 A2 | 6/2002 |
| EP | 1475140 A1 | 11/2004 |
| EP | 1547669 A1 | 12/2004 |
| EP | 1835141 A2 | 9/2007 |
| FR | 2884859 A1 | 10/2006 |
| WO | WO0134950 A1 | 5/2001 |
| WO | 2006068849 A1 | 6/2006 |
| WO | 2006068850 A1 | 6/2006 |
| WO | WO2006092392 A1 | 9/2006 |
| WO | WO2007147041 A2 | 12/2007 |

* cited by examiner

SYSTEM AND METHOD FOR SUPPLYING OXYGENATE REDUCTANTS TO AN EMISSION TREATMENT SYSTEM

CROSS-REFERENCE TO RELATED APPLICATION

This application is a Continuation-In-Part of copending U.S. patent application Ser. No. 11/301,231 filed on Dec. 12, 2005, and entitled "System and Method for Supplying Reductants to an Emission Treatment System."

FIELD OF THE INVENTION

The invention includes embodiments that relate to an emission treatment system, and more particularly to supplying reductants to an emission treatment system to improve its NOx conversion efficiency.

BACKGROUND OF THE INVENTION

Current emission control regulations necessitate the reduction of pollutant species in diesel engine exhaust. NOx, principally NO and $NO_2$, contributes to smog, ground level ozone formation and acid rain. NO is produced in large quantities at the high combustion temperatures associated with diesel engines. $NO_2$ is formed principally by the post oxidation of NO in the diesel exhaust stream. Exhaust after treatment devices achieve NOx reduction by using a reductant agent. The reductant agent is added to the exhaust gas entering the after treatment device and reacts with NOx over a catalyst in a process of selective catalytic reduction (SCR). Typical reducing agents may include light hydrocarbons and oxygen bearing compounds like alcohols.

Known methods of supplying the reductants may involve supplying the reducing agents and the fuel separately or may involve chemically producing the reducing agent in situ from the fuel itself. Such methods typically employ complex subsystems such as special purpose pumps, filters, storage tanks and the like. Additionally, these systems also require valuable space and specialized materials, thereby involving additional expenses. Accordingly, there is need for an improved system and method for supplying reductants to provide better overall economy and ease of operation.

SUMMARY OF THE INVENTION

Embodiments of the invention provide systems and methods for the on-board separation and use of oxygenates as reducing agents for hydrocarbon based SCR treatment of NOx gases. Oxygenates are active reductants in the selective catalytic reduction of NOx in lean-burn engine exhaust.

Briefly stated, in accordance with one embodiment of the invention, there is provided a system for supplying reductants to an emission treatment unit comprising a fuel tank adapted to directly or indirectly supply a first premixed fuel stream and a second premixed fuel stream, each fuel stream comprising a primary fuel component and an oxygenate reductant component; an engine in fluid communication with the fuel tank, wherein the engine is configured to receive the first premixed fuel stream and create an exhaust stream; an emission treatment unit to treat the exhaust stream; a separation unit configured to receive the second premixed fuel stream, separate the second premixed fuel stream into a first fraction stream and a second fraction stream, and supply the first fraction stream to the emission treatment unit, wherein the first fraction stream comprises a higher concentration of the oxygenate reductant component than the second fraction stream.

In accordance with another embodiment of the invention, there is provided a method for supplying reductants to an emission treatment unit including supplying a first premixed fuel stream to an engine, wherein the engine is configured to create an exhaust stream; supplying a second premixed fuel stream to a separation unit, wherein the first and second premixed fuel streams each comprise an oxygenate reductant component and a primary fuel component; separating at least a portion of the second premixed fuel stream into a first fraction stream and a second fraction stream via the separation unit, wherein the first fraction stream comprises a higher concentration of the oxygenate reductant component than the second fraction stream; and supplying the first fraction stream to an emission treatment unit to treat the exhaust stream.

DETAILED DESCRIPTION

Figure 1:
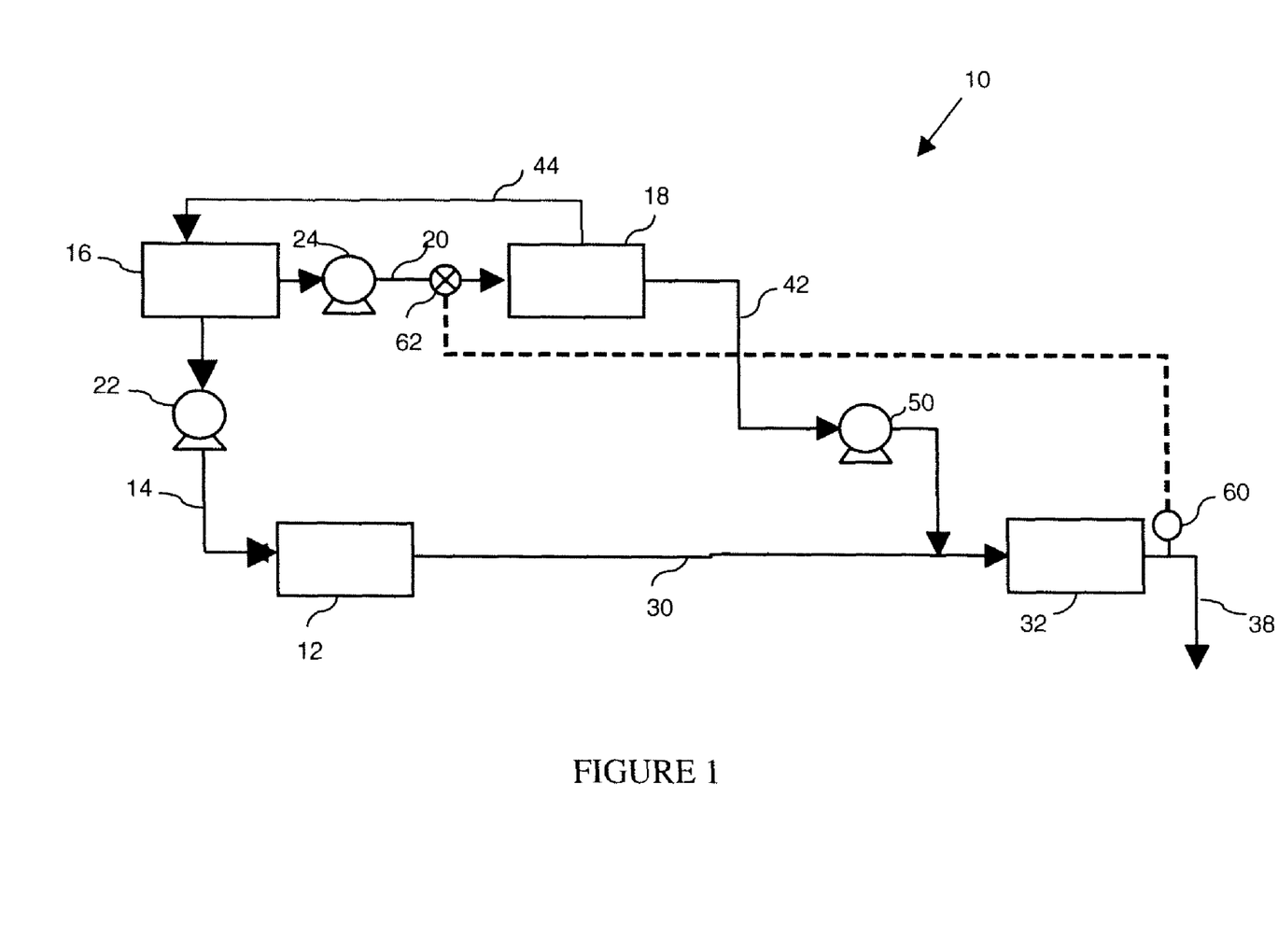
FIG. 1 is a schematic diagram of an exemplary system for supplying reductants to an emission treatment unit in accordance with an embodiment of the invention.

FIG. 1 is a schematic diagram of an exemplary system 10 for reducing NOx emissions from an engine in accordance with one embodiment of the invention. The system 10 includes an engine 12 that is directly supplied with a first premixed fuel stream 14 from a fuel tank 16. An on-board separation unit 18 is directly supplied with a second premixed fuel stream 20 from the fuel tank 16. If desired, the fuel tank 16 may be adapted to indirectly supply the first premixed fuel stream 14 to the engine 12 and the second premixed fuel stream 20 to the separation unit 18 via a single premixed fuel stream (not shown) exiting the fuel tank that is split, or comprises a slip stream, to form the first and second premixed fuel streams. The premixed fuel streams 14 and 20 each include a primary fuel component, generally comprising a fuel suitable for operation of engine 12, and an oxygenate reductant component suitable for use in NOx reduction as discussed below. The separation unit 18 separates the oxygenate reductant component from the primary fuel component in the second premixed fuel stream 20.

The fuel tank 16 may be adapted to supply the first premixed fuel stream 14 to a first fuel pump 22, wherein the first fuel pump is adapted to pump the first premixed fuel stream to the engine 12. The fuel tank 16 is also adapted to supply the second premixed fuel stream 20 to a second fuel pump 24. The second fuel pump 24 pumps the second premixed fuel stream 20 to the separation unit 18. A portion of the first premixed fuel stream 14 is burnt in the engine 12 during operation of the engine and an emission of exhaust gases containing NOx is produced thereby. The exhaust gases, thus produced, are discharged through an exhaust stream 30. The exhaust stream 30 carries the exhaust gases to an emission treatment unit 32 where the exhaust stream is treated by selective catalytic reduction. The resulting treated exhaust steam 38 containing reduced NOx emissions, is exhausted into the atmosphere.

The systems and methods of the invention allow for the use of one fuel tank 16 for carrying the fuel and reductant together instead of requiring an extra storage tank for the SCR reductant in addition to the fuel tank. This is advantageous from an implementation and distribution point of view. For example, the system can be installed on existing locomotive engines.

Various separation techniques may be used to achieve the separation of the oxygenate reductant component from the primary fuel component. For example, the separation unit 18 may be a flash, distillation and/or membrane separation unit. The separation unit 18 separates the second premixed fuel stream 20 into a first fraction stream 42 and a second fraction stream 44. Because the separation unit 18 serves to separate the reductant component from the primary fuel component, the first fraction stream 42 includes a higher concentration of the oxygenate reductant than the second fraction stream 44. The first fraction stream 42 is supplied to the emission treatment unit 32 via exhaust stream 30. The separation unit 18 may supply the first fraction stream 42 to a first fraction pump 50, wherein the first fraction pump is adapted to pump at least a portion of the first fraction stream to the emission treatment unit 32 via exhaust stream 30, as shown in FIG. 1. In another embodiment of the invention (not shown), a portion of the first fraction stream 42 may be sent back to the fuel tank 16 or to the engine 12 directly.

The first fuel pump 22, second fuel pump 24, and first fraction pump 50 may each be an electrically actuated fuel pump. In another embodiment of the invention, the pumps 22, 24 and 50 may be a fuel injector.

Figure 2:
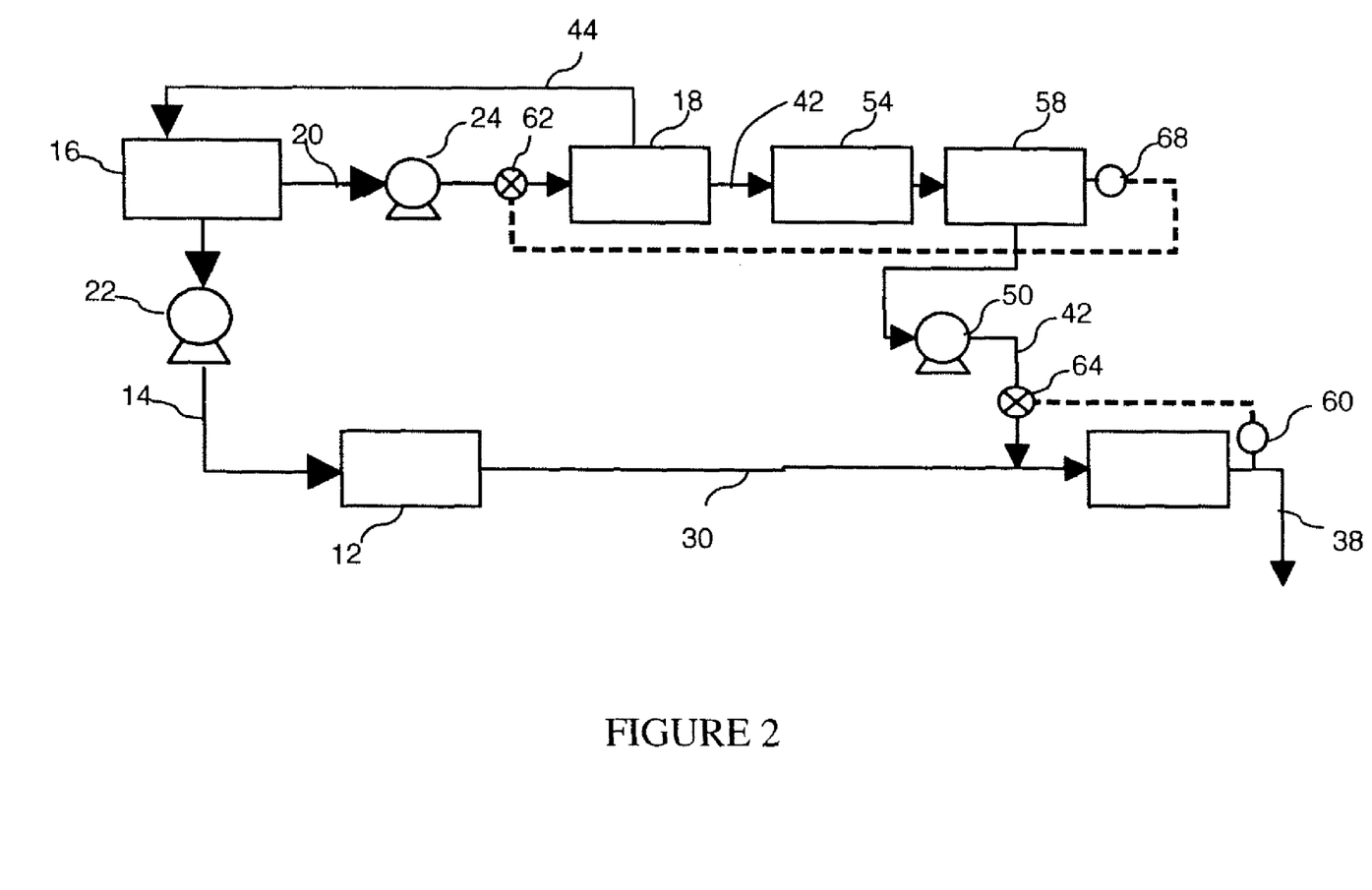
FIG. 2 is a schematic diagram of an exemplary system for supplying reductants to an emission treatment unit in accordance with an alternative embodiment of the invention.

Referring to FIG. 2, a condenser 54 may be disposed in fluid communication with the separation unit 18 for condensing at least a portion of the first fraction stream 42 exiting the separation unit. Accordingly, the oxygenate reductant in the first fraction stream 42 can be condensed in the condenser 54 and injected into the exhaust stream 30 as a liquid, or it can be condensed and then stored in a holding tank 58, as shown in FIG. 2. The second fraction fuel stream 44 is recycled to the fuel tank 16 (See FIGS. 1 and 2). Complete separation of the oxygenate reductant component from the primary fuel component, while desired, is not necessary because most fuels can also be used as reductants in hydrocarbon based SCR. In another embodiment of the invention (not shown), a portion of the second fraction stream 44 may be sent to the engine 12 directly and burnt as the main fuel of the engine. In yet another embodiment of the system (not shown), if the system 10 is equipped with a diesel particulate filter that uses a fuel burner for regeneration, the second fraction 44 may be sent to the fuel burner.

Referring to FIGS. 1 and 2, the amount of oxygenate that is separated can be controlled using a NOx sensor 60 that is placed down stream of the emission treatment unit 32. The NOx sensor 60 measures the concentration of NOx in the treated exhaust steam 38 exiting the emission treatment unit 32. The NOx sensor 60 sends a signal representing the NOx concentration in the treated exhaust stream 38 to a second premixed fuel controller 62. The second premixed fuel controller 62 integrates the processed information and determines if the system parameters are indicative of proper control of the treated exhaust stream 38, and may further determine whether there is a need for supply of reductants to the emission treatment unit 32. Accordingly, the second premixed fuel controller 62 regulates the flow of the second premixed fuel stream 20, entering the separation unit 18, based on the signal received from the NOx sensor 60. The second fuel pump 24 is in communication with the second premixed fuel controller 62, and the controller directly controls and monitors the operation of the second fuel pump to inject a portion of the second premixed fuel stream 20 into the separation unit 18.

Referring to FIG. 2, the NOx sensor 60 may alternatively be used to directly control the amount of oxygenate reductant flow, i.e. the first fraction stream 42 flow, into the emission treatment unit 32. The NOx sensor 60 sends a signal representing the NOx concentration in the treated exhaust stream 38 to a first fraction controller 64. The first fraction controller 64 regulates the flow of the first fraction stream 42 entering the emission treatment unit 32, based on this signal. The first fraction pump 50 is in communication with the first fraction controller 64, and the controller 64 directly controls and monitors the operation of the first fraction pump to inject at least a portion of the first fraction stream 42 into the emission treatment unit 32 via exhaust stream 30.

FIG. 2 also shows an additional control loop from a liquid level switch in the holding tank 58 that controls the amount of premixed fuel being fed to the separation unit 18. Specifically, a holding tank sensor 68 measures the volume of the condensed first fraction stream 42 in the holding tank 58. The holding tank sensor 68 sends a signal representing the measured first fraction volume to the second premixed fuel controller 62, and the controller regulates the flow of the second premixed fuel stream 20 entering the separation unit 18 based on this signal.

Figure 3:
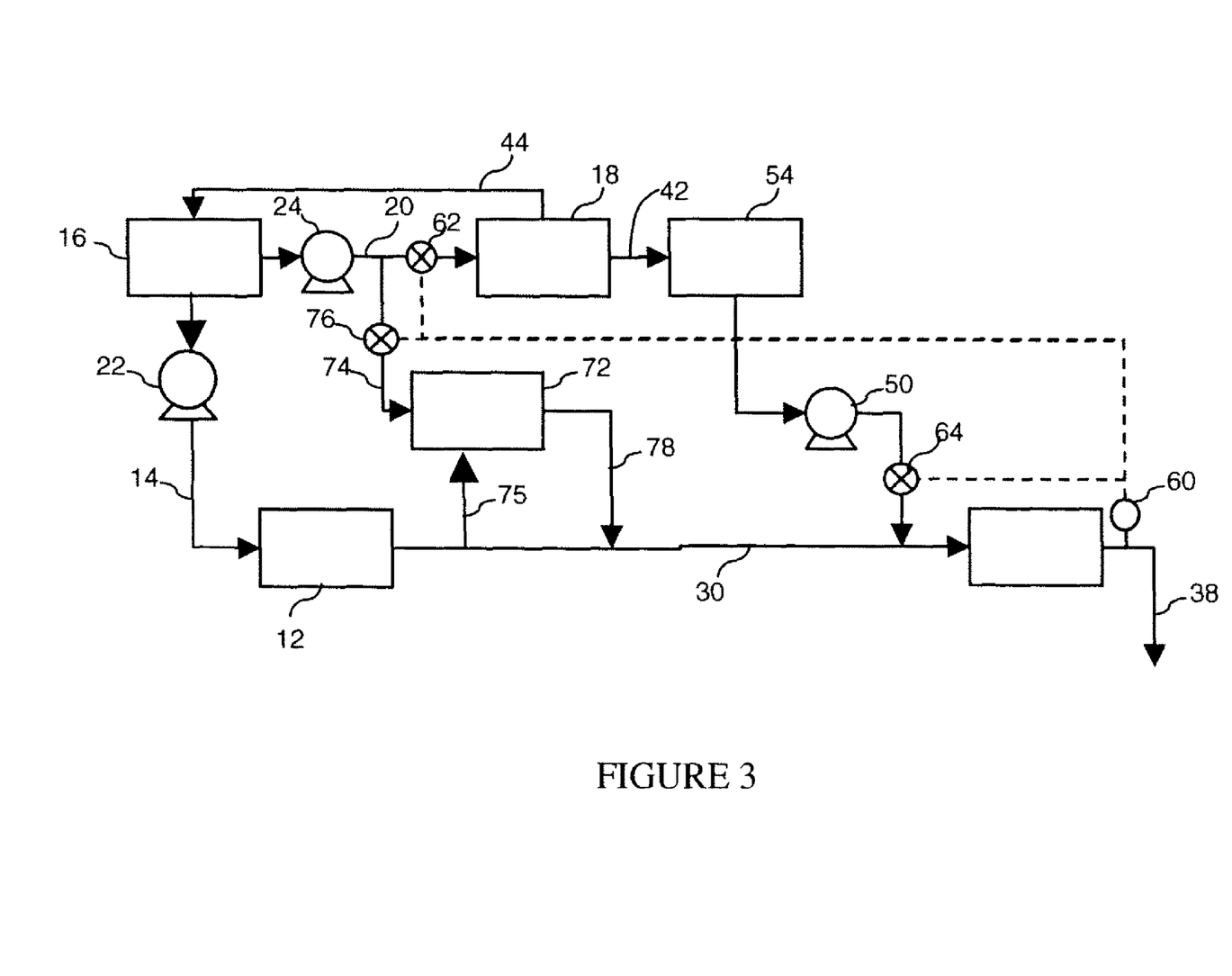
FIG. 3 is a schematic diagram of an exemplary system for supplying reductants to an emission treatment unit in accordance with an alternative embodiment of the invention.

In an alternative embodiment illustrated in FIG. 3, a fuel conversion unit 72 in fluid communication with the fuel tank 16 is incorporated to supply hydrogen as well as other hydrocarbon reductants to the exhaust stream 30. The fuel conversion unit 72 is adapted to receive a split fuel stream 74 from the second premixed fuel stream 20. The fuel conversion unit 18 converts at least a portion of the fuel entering the unit via the split fuel stream 74 into reductants. Any fuel conversion unit 72 known to those having skill in the art may be used in the system and methods of the invention, wherein the fuel conversion unit is capable of producing reductants effective for the selective catalytic reduction of NOx. In a preferred embodiment, the fuel conversion unit 72 is a catalytic partial oxidation unit. If the fuel is converted to reductants via an oxidation reaction, an oxygen supply stream 90 comprising oxygen is supplied to the fuel conversion unit 72 to partially oxidize the fuel within the unit. The oxygen supply stream 75 may be comprised of air from the surrounding atmosphere, an exhaust slip stream from the engine (as shown), or any other suitable oxygen source. The fuel conversion unit 72 may produce reductants including, but not limited to hydrogen, as well as other hydrocarbon reductants such as diesel fuel, partially cracked diesel fuel, gasoline, olefins, paraffins, isoparaffins, olefinic esters, oxygenates, and aromatics such as naphthalenes and naphtha. Hydrogen has been shown to be advantageous as a co-reductant with hydrocarbons, such as but not limited to oxygenates, alkanes, alkenes, acetylenes, aromatics, and naphthalenes.

A controller 76 may be used to regulate the flow of the split fuel stream 74. The NOx sensor 60 sends a signal representing the NOx concentration in the treated exhaust stream 38 to the controller 76. The controller 76 regulates the flow of the split fuel stream 74 entering the fuel conversion unit 72, based on this signal. Reductant stream 78 exiting the fuel conversion unit 72 supplies the additional reductants directly to exhaust stream 30.

Structurally, the controllers 62, 64 and 76, as shown in FIGS. 1-3, may each be a conventional microcomputer, including conventional components such as a microprocessor unit, input/output ports, read-only memory, random access memory, read-out displays, and conventional data bus. Furthermore, the controllers 62, 64 and 76 may each include a micro-controller or a solid-state switch to communicate with the sensors 60 and 68. In one embodiment, the controllers 62, 64 and 76 may each be an electronic logic controller that is programmable by a user. In another embodiment, each controller 62, 64 and 76 may include an analog-to-digital converter accessible through one or more analog input ports.

As will be recognized by those of ordinary skill in the art, the controllers 62, 64 and 76 may be embodied in several other ways. In one embodiment, the controllers 62, 64 and 76 may include a logical processor (not shown), a threshold detection circuitry (not shown) and an alerting system (not shown). Typically, the logical processor is a processing unit that performs computing tasks. It may be a software construct made up using software application programs or operating system resources.

If the separation unit 18 operates via membrane separation, the unit may be selected from a non-exclusive list including reverse osmosis membrane separation systems, electro-kinetic separation systems, pervaporation systems, perstraction systems and the like. Perstraction involves the selective dissolution of particular components (i.e. the oxygenate reductant component in the second premixed fuel stream 20) into the membrane, the diffusion of those components through the membrane and the removal of the diffused components from the downstream side of the membrane by use of a liquid sweep stream.

In a pervaporation separation unit 18, the second premixed fuel stream 20 can be fed into the separation unit whereby the oxygenate reductant component passes through the membrane and evaporates on the permeate side of the membrane, while the primary fuel component remains on the retentate side and is recycled to the fuel tank 16 as the second fraction stream 44. The evaporation of the oxygenate reductant component would be driven by a vacuum applied to the retentate side of the membrane. The oxygenate reductant in the first fraction stream 42 is sent directly to the exhaust stream 30. Alternatively, the oxygenate reductant in the first fraction stream 42 is condensed in a condenser 54. The condensed first fraction stream 42 is optionally sent to a holding tank 58, prior to being fed to the exhaust stream 30, as shown in FIG. 2.

Figure 4:
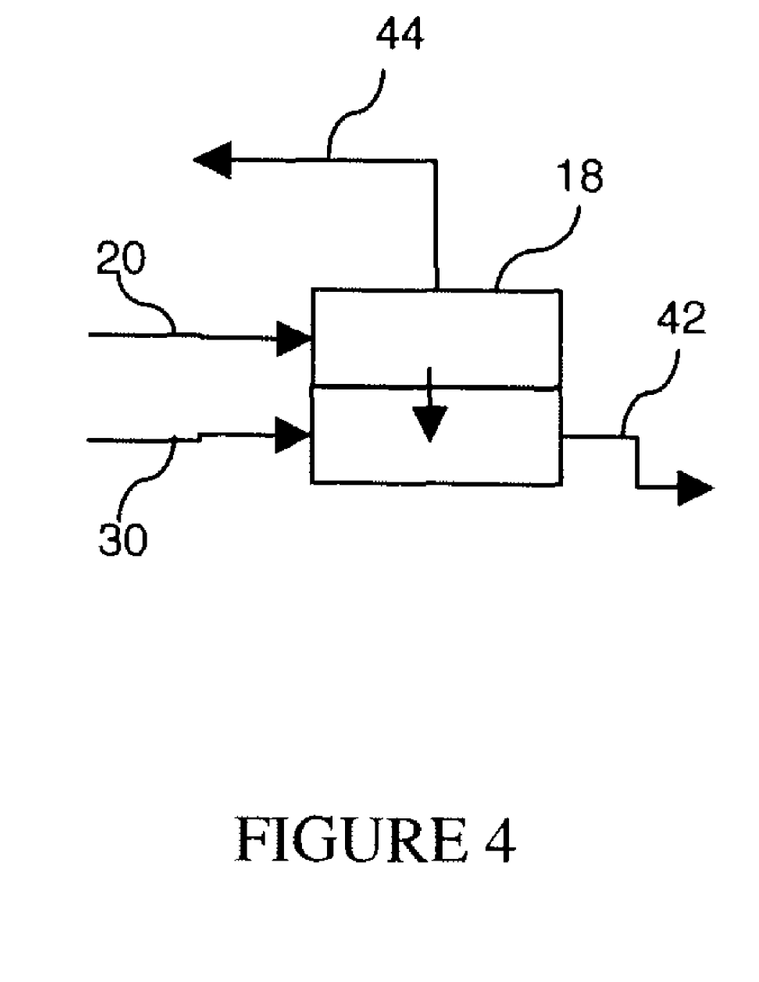
FIG. 4 is a schematic diagram of a separation unit in accordance with an alternative embodiment of the invention.

In an alternative membrane separation unit illustrated in FIG. 4, the exhaust stream 30, or a slip stream from the exhaust stream is fed across the permeate side of the membrane. This allows the direct incorporation of the oxygenate reductant component from the second premixed fuel stream 20 into the exhaust stream 30. The amount of the oxygenate reductant component entering the exhaust stream 30 is controlled by the pressure difference across the membrane, wherein the second premixed fuel stream side 20 is at a higher pressure than the exhaust stream 30 side when oxygenate is desired in the exhaust stream. The membrane process could be a pressure driven process such as nanofiltration or a vacuum driven process such as pervaporation. In one embodiment, the process of the invention employs selective membrane separation conducted under pervaporation or perstraction conditions.

During a pervaporation process, a partial pressure is generated at the permeate side of the membrane by means of a vacuum pump, or by means of an inert gas flow. The components of the liquid that move through the membrane, e.g. the oxygenate reductant component in the premixed fuel stream 20, are vaporized by the low pressure, removed and condensed. The pervaporation process relies on vacuum or sweep gas on the permeate side to evaporate or otherwise remove the permeate from the surface to the membrane. The feed to the pervaporation unit is in the liquid and/or gas state. When the feed is in the gas state the process can be described as vapor permeation.

The membranes disposed in the separation unit 18 may be selected from a non-exclusive list including polymeric, ceramic, carbon, and hybrids of these and may be homogenous or heterogeneous, symmetric or asymmetric in structure, solid or liquid, may carry a positive or negative charge or be neutral or bipolar. Furthermore, the membranes can be used in any convenient form such as sheets, tubes or hollow fibers. Flat sheet membranes can be packaged as spiral wound module elements or pleated cartridges, or be used in single sheets in plate-and-frame systems. Tubular or hollow fiber configurations are formed into bundles and potted at one or both ends. Multiple separation elements in spiral wound, plate and frame, or hollow fibers configurations, can be employed either in series or in parallel.

In one embodiment, the separation unit 18 includes a membrane with differential permeability. Differential permeability in this case means that the permeability of the oxygenate reductant component through the membrane is substantially different than that of the primary fuel component and the difference is to such an extent that a separation of the two components occurs. In many cases, the oxygenate reductant component comprises chemical species having molecules of substantially smaller size than the molecules of fuel that are present in the primary component. Differential permeability in some embodiments is thus achieved by selecting, from those available membranes in the art, for example, a membrane having a pore size sufficient to allow the smaller component to move through the membrane while excluding the larger component. Transport of the reductant component through one such membrane may be affected by convection or by diffusion of individual molecules, induced by an electric field or concentration, pressure or temperature gradient. In one embodiment of the invention, the membrane separation unit 18 may be an ultrafiltration membrane separation unit and the driving force for transport of the oxygenate reductant components of the fuel across the membrane may be a pressure differential. The membrane materials in such ultrafiltration membrane separation unit 18 may include polymeric materials such as polysulfone, polypropylene, nylon 6, polytetrafluoroethylene (PTFE), PVC, acrylic copolymer and the like. In another embodiment of the invention, inorganic materials such as ceramics, carbon based membranes, zirconia and the like may be used in the ultrafiltration based membrane separation systems. In yet another embodiment of the invention, the separation of the reductant component from the primary fuel component may be accomplished using selective facilitated transport membranes. Selective facilitated transport membranes with typically high reductant/fuel selectivity of about 200 may typically include cross-linked polyvinyl alcohol-containing $AgNO_3$ membranes and $Ag+$ exchanged perfluorosulfonic acid membranes.

Figure 5:
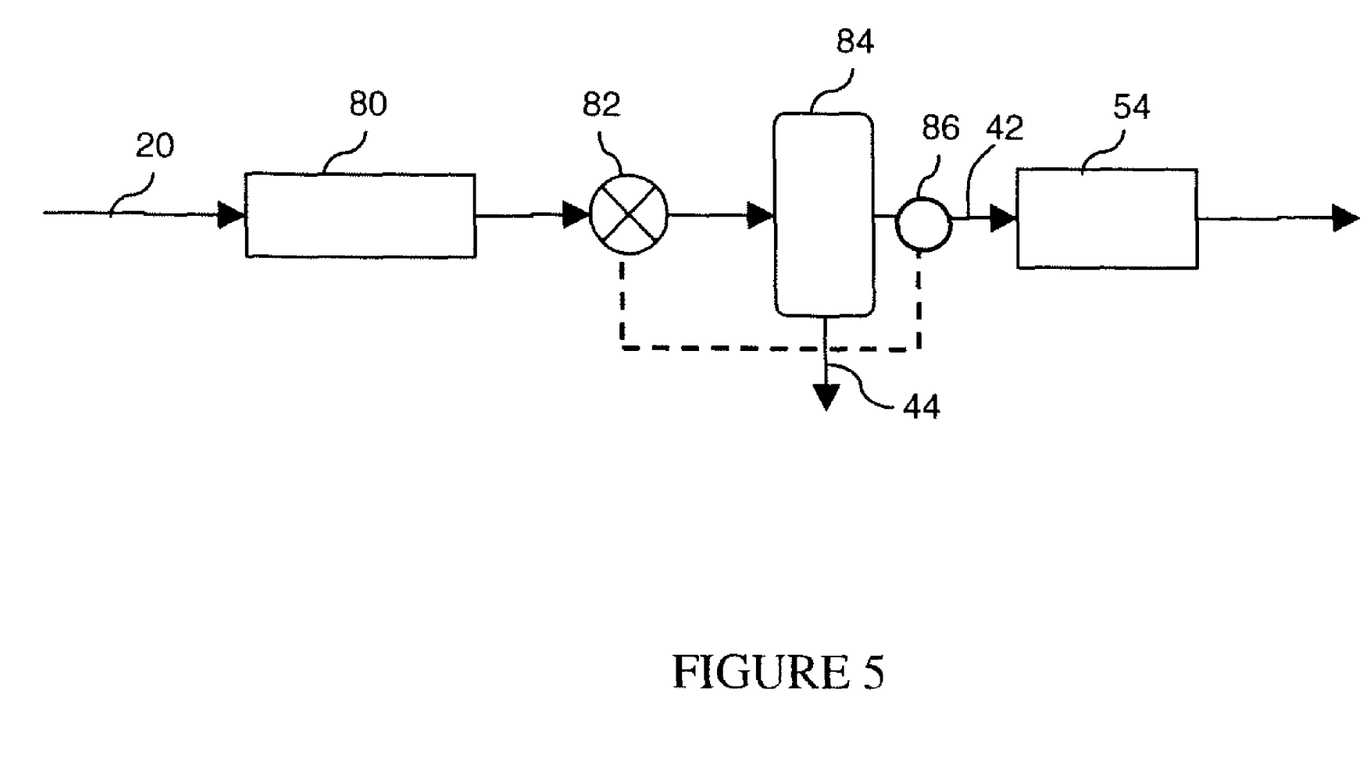
FIG. 5 is a schematic diagram of a separation unit in accordance with an alternative embodiment of the invention.

In another embodiment of the invention, the separation unit 18 is a flash separation unit as illustrated in FIG. 5. In this embodiment, the separation unit 18 flashes the lower boiling point oxygenate reductant component from the fuel mixture. This is accomplished by feeding the second premixed fuel stream 20 into a heat exchanger 80 via pump 24 (not shown). A pressure control valve 82 located downstream of the heat exchanger 80, which actuates is set to actuate at some pressure above the vapor pressure of the oxygenate reductant component. The energy required for the flash could be provided by a split stream of the exhaust, heated engine coolant, electrically, or a combination thereof. The oxygenate reductant component and primary fuel component then enter a flash vessel 84 where the liquid primary fuel component and gaseous oxygenate reductant component are separated. A flash vessel sensor 86 measures the pressure within the flash vessel 84 and sends a signal representing the measured pressure, to the pressure control valve 82. The pressure control valve 82 controls the pressure within the flash vessel 84 based on this signal. The second fraction fuel stream 44 is recycled to the fuel tank 16 and the first fraction oxygenate stream 42 is sent directly to the exhaust stream 30, or condensed in a condenser 54, optionally stored, and then sent to the exhaust stream as shown in FIG. 2.

Figure 6:
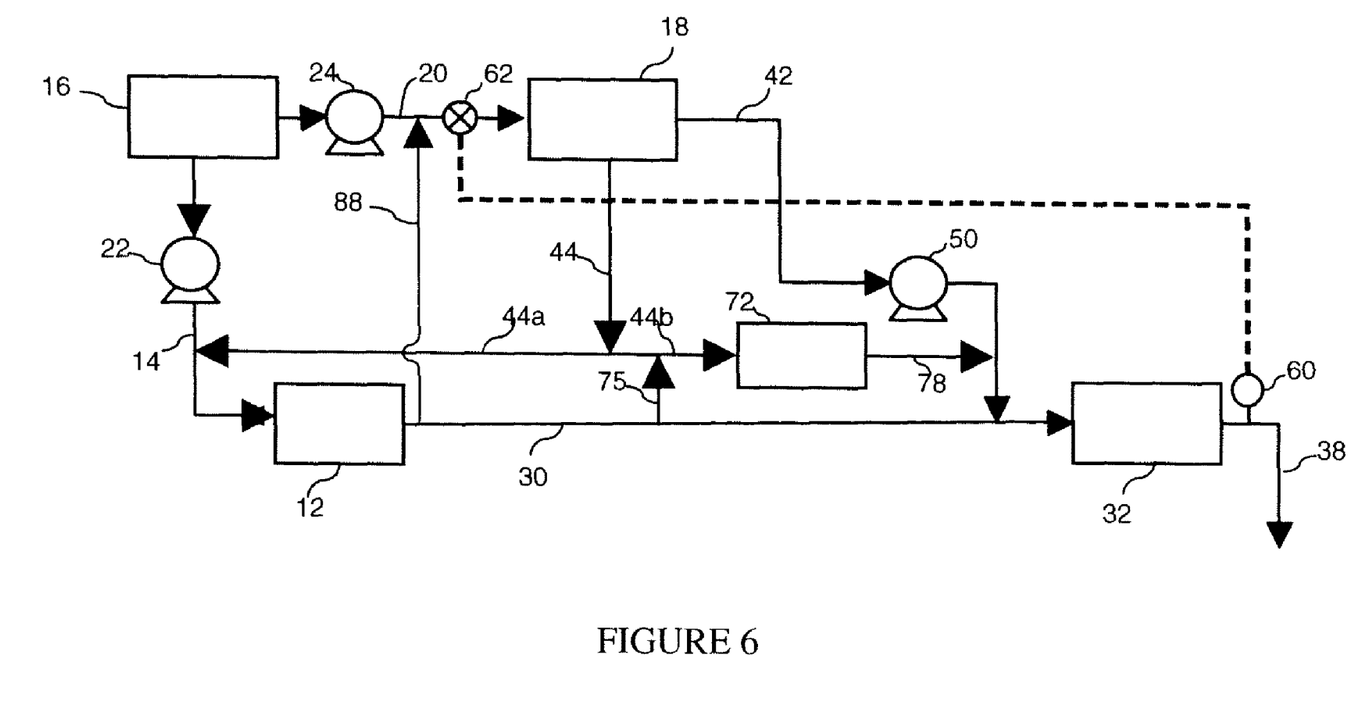
FIG. 6 is a schematic diagram of an exemplary system for supplying reductants to an emission treatment unit in accordance with an alternative embodiment of the invention.
Figure 7:
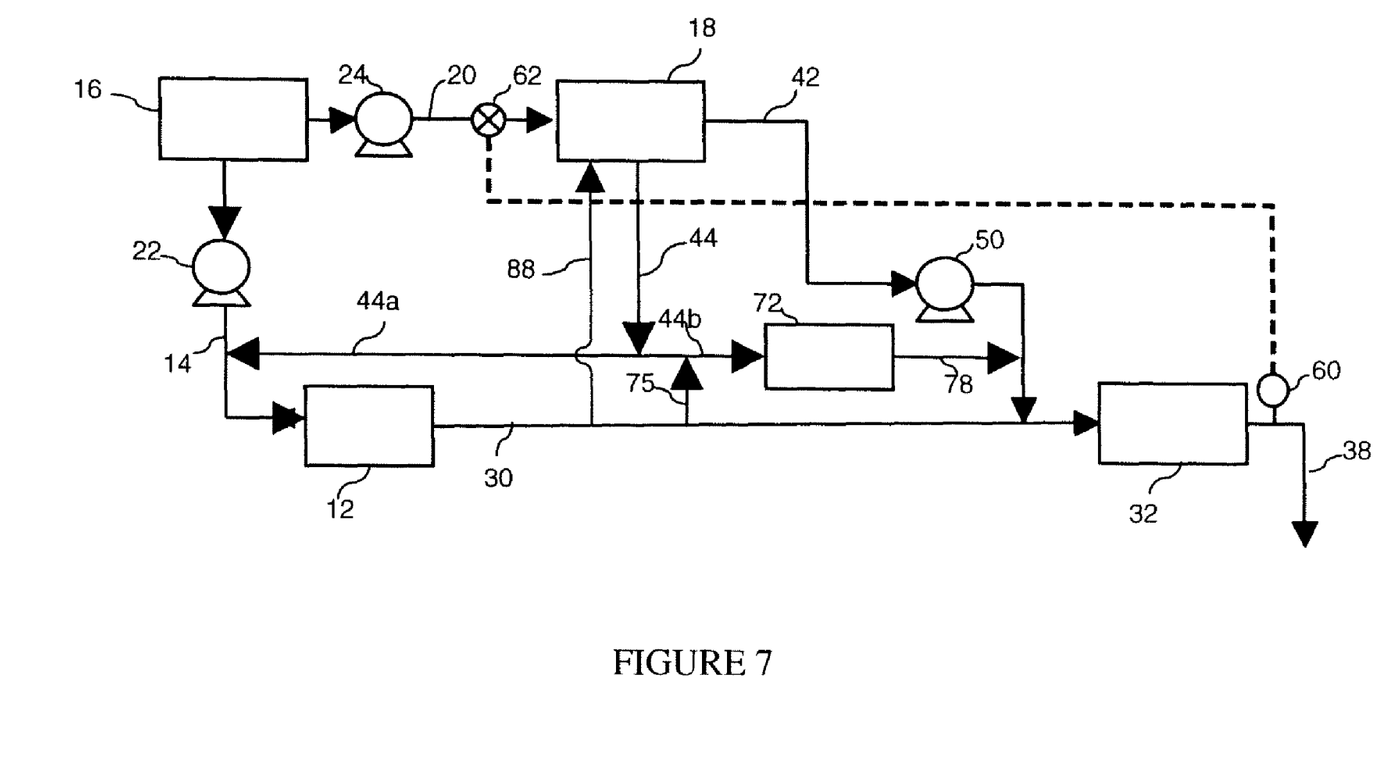
FIG. 7 is a schematic diagram of an exemplary system for supplying reductants to an emission treatment unit in accordance with an alternative embodiment of the invention.

Referring to FIG. 6, shown is an alternative embodiment of the invention wherein the separation unit 18 is a cyclone flasher. In this embodiment, the second fraction stream 44 is split into two streams 44a and 44b. Second fraction stream 44a is supplied to the first premixed fuel stream 14, and second fraction stream 44b is supplied to a fuel conversion unit 72. Alternatively, second fraction stream 44a may be supplied to the fuel tank 16. The fuel conversion unit 72 is preferably a catalytic partial oxidation unit. An engine exhaust slip stream 88 is supplied to the first premixed fuel stream 20 entering the separation unit 18. The separation unit 18 separates the oxygenate reductant component and light hydrocarbons ($C_8$-$C_{10}$) from the primary fuel component. An oxygen supply stream 75, which may be an engine exhaust slip stream as shown, is supplied to the first fraction stream 44b entering the fuel conversion unit 72. The fuel conversion unit 72 supplies additional reductants such as hydrogen and other hydrocarbon reductants to the emission treatment unit 32. Specifically, reductant stream 78 exiting the fuel conversion unit 72 supplies the additional reductants to the first fraction stream 42. Alternatively, the reductant stream 78 may be configured to supply the additional reductants to the emission treatment unit 32 via exhaust stream 30. In another embodiment of the invention, as shown in FIG. 7, the separation unit 18 is a bubbling pack column, and the engine exhaust slip stream 88 is supplied directly to the separation unit 18.

The emission treatment unit 32, in one embodiment of the invention may include after-treatment devices in which NOx in the engine exhaust stream 30 is continuously removed by reacting with active oxygenate reductants in the presence of a catalyst to produce $N_2$. In one embodiment of the invention, the catalysts may include oxidation catalysts that convert a portion of incoming NO to $NO_2$. In another embodiment of the invention, the catalysts may be lean NOx catalysts capable of reducing NOx in an oxygen rich environment. Efficiency of the reduction catalysts may be further increased in the presence of additional reductants. Such additional reductants may typically include hydrocarbon compounds. A number of hydrocarbon reductants may typically be disposed along with the fuel, as described herein.

The fuel used in the embodiments of the invention includes any fuel suitable for operation of the engine 12, such as gasoline. In one embodiment of the invention, the fuel may be normal diesel fuel. In another embodiment of the invention, the fuel may be a renewable fuel. In one embodiment of the invention, the renewable fuel is green diesel fuel. In another embodiment of the invention, the renewable fuel may be biodiesel, which consists of fatty acid methyl esters and may be made from vegetable oil, animal fat, or waste grease. Biodiesel is typically used as a blend with conventional diesel. In another embodiment of the invention, ethanol may also be blended into diesel fuel. Ethanol/diesel, ethanol/biodiesel and ethanol/gasoline fuel blends are readily available on the market, so no additional infrastructure would be required to mix the reductant with the fuel if desired.

In yet another embodiment of the invention, Fischer-Tropsch diesel may be used as a renewable fuel that at times may be produced from biomass. Fischer-Tropsch or gas-to-liquid (GTL) fuels are typically created by a Fischer Tropsch process that makes liquid diesel fuel from a synthetic mix of gases including CO and $H_2$. Typical Fischer-Tropsch fuels may contain very low sulfur and aromatic content and very high cetane numbers. Fischer-Tropsch diesel fuels typically reduce regulated exhaust emissions from the engines and the vehicles where this fuel is used. Additionally, the low sulfur content of these fuels may enable use of advanced emission control devices.

In embodiments of the invention, oxygenate reductants may be mixed with fuel in the fuel tank 16, whereby the fuel tank delivers a premixed fuel stream comprising a primary fuel component and an oxygenate reductant component. Oxygenate reductants are hydrocarbons that include one or more oxygen atoms in their molecules. Suitable oxygenate reductants may include alcohols, aldehydes, ketones, ethers, esters, or combinations thereof. The alcohols may include methanol, ethanol, iso-propanol and the like. Preferably, the oxygenate reductant is ethanol. Alcohols form neither particulate matter nor deposits when exposed to temperatures characteristic of diesel exhaust. Moreover, alcohols, such as methanol or ethanol or iso-propanol are sufficiently soluble in diesel fuel to enable the requisite quantity of the reductant to be conveyed to an emission treatment system via the engine fuel itself. The concentration of the reductants in the premixed fuel may typically be in the range of about 0.5 percent to about 20 percent by weight of the total fuel.

In one embodiment of the invention, hydrocarbon reductants may be used in order to aid in the production of oxygenated hydrocarbons, i.e. oxygenate reductants, as represented by equation (1) below.

Hydrocarbons (HC)+$O_2$=>oxygenated HC  (1)

NOx+ oxygenated HC+$O_2$=>$N_2$+$CO_2$+$H_2O$  (2)

The hydrocarbon reductants may include propene, ethane, diesel fuel, or any other suitable hydrocarbons and the oxygenated hydrocarbons may include methanol, ethanol, propanol, butanol, pentanol, hexanol, methanal, ethanal, propanal, butanal, propenal, acetone, 2-butanone, and 3-penten-2-one and any combination thereof. Although the lean-NOx reducing reaction is a complex process comprising many steps, one of the reaction mechanisms for lean NOx catalysts may be summarized as follows. A hydrocarbon-enriched reductant may be converted to an activated, oxygenated hydrocarbon that may interact with the NOx compounds to form organo-nitrogen containing compounds, which are then reduced to $N_2$. Through these or other mechanisms the NOx species are eventually reduced to $N_2$.

The principles of the invention are not limited to any particular type of engine. One of ordinary skill will recognize that other embodiments of the invention may be suited for many of the combustion-powered vehicles. For example, internal combustion engines that are used in railroad locomotives, in vehicles that run on roads such as trucks, municipal transport vehicles, city buses, cars and other passenger vehicles or in ships may be installed with this type of reductant supply system. The engine may also be a liquid fueled engine, a compression ignition engine, a gasoline engine, and any combination thereof. The gasoline engine may include a lean burn gasoline engine. A lean burn engine is one that produces an oxygen rich exhaust, which is defined as an exhaust having a higher molar ratio of oxygen than the total molar ratio of reductive compounds such as carbon-monoxide, hydrogen, hydrocarbons, and oxygenated hydrocarbons. Examples of such lean burn engine systems may include diesel engines, some natural gas or alternative fuel engines, liquid or gaseous-fueled turbine engines and various lean burn gasoline engine systems.

Figure 8:
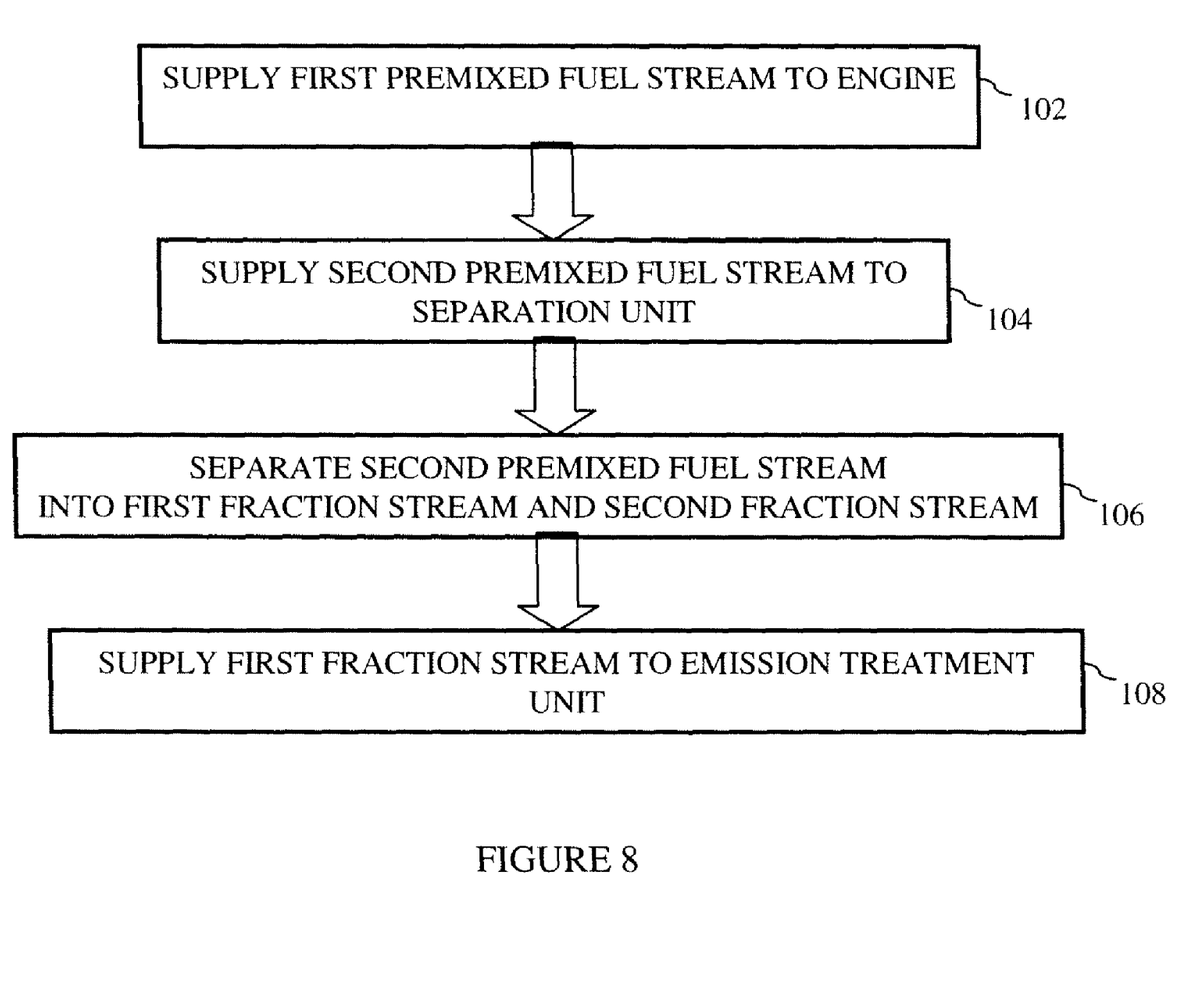
FIG. 8 illustrates a method for supplying reductants to an emission treatment unit in accordance with an embodiment of the invention.

FIG. 8 illustrates an exemplary method for supplying reductants to an emission treatment unit in accordance with one embodiment of the invention. As will be appreciated by one of ordinary skill in the art, the method may represent one or more of processing strategies such as event-driven, interrupt-driven, multi-tasking, multi-threading, and the like. As such, various steps or functions illustrated herein may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

To this end, beginning at block 102, a first premixed fuel stream 14 comprising an oxygenate reductant component and a primary fuel component is supplied to an engine 12, wherein the engine is configured to create an exhaust stream. A second premixed fuel stream 20 comprising an oxygenate reductant component and a fuel component is supplied to a separation unit 18 as in block 104. Referring to block 106, at least a portion of the second premixed fuel stream 20 is separated into a first fraction stream 42 and a second fraction stream 44 by passing the fuel stream 20 through the separation unit 18, wherein the first fraction stream comprises a higher concentration of the oxygenate reductant component than the second fraction stream. The first fraction stream is supplied to an emission treatment unit as shown in block 108 to aid the treatment of the emission.

All cited patents, patent applications, and other references are incorporated herein by reference in their entirety.

All ranges disclosed herein are inclusive of the endpoints, and the endpoints are combinable with each other.

It is to be noted that the terms "first," "second," and the like as used herein do not denote any order, quantity, or importance, but rather are used to distinguish one element from another. The modifiers "about" and "approximately" used in connection with a quantity are inclusive of the stated value and have the meaning dictated by the context (e.g., include the degree of error associated with measurement of the particular quantity). The use of the terms "a" and "an" and "the" and similar referents in the context of describing the invention (especially in the context of the following claims) are to be construed to cover both the singular and the plural, unless otherwise indicated herein or clearly contradicted by context.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

The invention claimed is:

1. A system for supplying reductants to an emission treatment unit comprising:
    a fuel tank adapted to directly or indirectly supply a first premixed fuel stream and a second premixed fuel stream, each fuel stream comprising a primary fuel component and an oxygenate reductant component;
    an engine in fluid communication with the fuel tank, wherein the engine is configured to receive the first premixed fuel stream and create an exhaust stream;
    an emission treatment unit to treat the exhaust stream;
    a separation unit configured to receive the second premixed fuel stream, the separation unit also configured to separate the second premixed fuel stream into a first fraction stream and a second fraction stream, and supply the first fraction stream to the emission treatment unit, wherein the first fraction stream comprises a higher concentration of the reductant component than the second fraction stream.

2. The system of claim 1, further comprising:
    a first fuel pump adapted to pump the first premixed fuel stream from the fuel tank to the engine.

3. The system of claim 1, further comprising:
    a first fraction pump adapted to pump at least a portion of the first fraction stream to the emission treatment unit.

4. The system of claim 1, wherein the fuel tank is adapted to receive the second fraction stream.

5. The system of claim 1, further comprising:
    a second premixed fuel controller that receives a signal representing a concentration of NOx in a treated exhaust stream exiting the emission treatment unit, the controller regulates the flow of the second premixed fuel stream into the separation unit in accordance with the received signal.

6. The system of claim 5, further comprising:
    a NOx sensor located downstream of the emission treatment unit and in communication with the second premixed fuel controller, the sensor measures the concentration of NOx in the treated emission stream and sends a signal to the second premixed fuel controller representing the measured concentration.

7. The system of claim 5, further comprising:
    a second fuel pump in communication with the second premixed fuel controller to pump the second premixed fuel stream to the separation unit.

8. The system of claim 1, further comprising:
    a condenser disposed in fluid communication with the separation unit for condensing at least a portion of the first fraction stream exiting the separation unit.

9. The system of claim 8, further comprising:
    a first fraction controller that receives a signal representing a concentration of NOx in a treated exhaust stream exiting the emission treatment unit, the controller regulates the flow of the first fraction stream into the emission treatment unit in accordance with the signal.

10. The system of claim 9, further comprising:
a NOx sensor located downstream of the emission treatment unit and in communication with the first fraction controller, the sensor measures the concentration of NOx in the treated emission stream and sends a signal to the second premixed fuel controller representing the measured concentration.

11. The system according to claim 9, further comprising:
a first fraction pump in communication with the first fraction controller to pump at least a portion of the first fraction stream into the exhaust stream.

12. The system according to claim 8, further comprising:
a holding tank disposed in fluid communication with the condenser unit to store the first fraction stream exiting the condenser unit.

13. The system according to claim 12, further comprising:
a second premixed fuel controller that receives a signal representing a volume of the first fraction in the holding tank, the controller regulates the flow of the second premixed fuel stream into the separation unit in accordance with the received signal.

14. The system according to claim 13, further comprising:
a holding tank sensor in communication with the second premixed fuel controller, the sensor measures the volume of the first fraction in the holding tank and sends a signal to the second premixed fuel controller representing the measured volume.

15. The system according to claim 13, further comprising:
a second fuel pump in communication with the second premixed fuel controller, to pump at least a portion of the second premixed fuel stream to the separation unit.

16. The system according to claim 1, further comprising:
a fuel conversion unit in fluid communication with the fuel tank, the fuel conversion unit configured to receive at least a portion of the second premixed fuel stream and supply additional reductants to the exhaust stream.

17. The system according to claim 16, wherein the additional reductants comprise hydrogen, hydrocarbons, or a combination thereof.

18. The system according to claim 1, wherein the emission treatment unit is a selective catalytic reduction treatment unit.

19. The system according to claim 18, wherein the separation unit is a membrane, distillation or flash separation unit.

20. The system according to claim 1, wherein the oxygenate reductant component comprises an alcohol, aldehyde, or ketone, or a combination thereof.

21. The system according to claim 20, wherein the oxygenate reductant component is ethanol.

22. The system according to claim 1, wherein the premixed fuel comprises diesel fuel, biodiesel fuel, green diesel fuel, or Fischer-Tropsch fuel, or any combination thereof.

23. The system according to claim 1, wherein the engine is a liquid fueled engine, a compression ignition engine, or a gasoline engine, or any combination thereof.

24. The system according to claim 23, wherein the gasoline engine is a lean burn gasoline engine.

25. A method for supplying reductants to an emission treatment unit comprising:
supplying a first premixed fuel stream to an engine, wherein the engine is configured to create an exhaust stream;
supplying a second premixed fuel stream to a separation unit, wherein the first and second premixed fuel streams each comprise an oxygenate reductant component and a fuel component;
separating at least a portion of the second premixed fuel stream into a first fraction stream and a second fraction stream via the separation unit, wherein the first fraction stream comprises a higher concentration of the oxygenate reductant component than the second fraction stream; and
supplying the first fraction stream to an emission treatment unit to treat the exhaust stream.

26. The method of claim 25, wherein the first and second premixed fuel streams are directly or indirectly supplied from a fuel tank, and the method further comprising:
supplying the second fraction stream to the fuel tank.

27. The method of claim 25, further comprising:
sensing a concentration of NOx in a treated exhaust stream exiting the emission treatment unit; and
regulating the flow of the second premixed fuel stream into the separation unit in accordance with the sensed signal.

28. The method of claim 25, further comprising:
sensing a concentration of NOx in a treated exhaust stream exiting the emission treatment unit; and
regulating the flow of the first fraction stream into the emission treatment unit in accordance with the sensed signal.

29. The method of claim 25, further comprising:
condensing at least a portion of the first fraction stream exiting the separation unit.

30. The method according to claim 29, further comprising:
storing at least a portion of the condensed first fraction stream in a holding tank.

31. The method of claim 30 further comprising:
sensing a volume of the first fraction in the holding tank; and
regulating the flow of the second premixed fuel stream into the separation unit in accordance with the sensed signal.
sensing a volume of the first fraction in the holding tank; and
regulating the flow of the second premixed fuel stream into the separation unit in accordance with the sensed signal.

32. The method of claim 25 further comprising:
converting at least a portion of the second premixed fuel stream into additional reductants; and
supplying the additional reductants to the exhaust stream.

33. The method of claim 25, wherein the exhaust stream is treated by selective catalytic reduction.

34. The method of claim 25, wherein at least a portion of the second premixed fuel stream is separated by membrane, distillation or flash separation or a combination thereof.

35. The method of claim 25, wherein the oxygenate reductant component comprises an alcohol, aldehyde or ketone, or a combination thereof.

36. The method of claim 35, wherein the oxygenate reductant component is ethanol.

37. The method of claim 25, wherein the premixed fuel comprises diesel fuel, biodiesel fuel, green diesel fuel, Fischer-Tropsch fuel, and any combination thereof.

38. The method of claim 25, wherein the engine is a liquid fueled engine, a compression ignition engine, a gasoline engine, and any combination thereof.

39. The method of claim 25, wherein the gasoline engine is a lean burn gasoline engine.

* * * * *

UNITED STATES PATENT AND TRADEMARK OFFICE
CERTIFICATE OF CORRECTION

| | | |
|---|---|---|
| PATENT NO. | : 8,056,322 B2 | Page 1 of 1 |
| APPLICATION NO. | : 11/971266 | |
| DATED | : November 15, 2011 | |
| INVENTOR(S) | : Winkler et al. | |

It is certified that error appears in the above-identified patent and that said Letters Patent is hereby corrected as shown below:

In Column 12, Lines 37-40, in Claim 31, delete "sensing a volume......sensed signal.".

Signed and Sealed this
Sixth Day of March, 2012

David J. Kappos
*Director of the United States Patent and Trademark Office*